F. S. SUTHERGREEN.
TIRE HOLDER AND TRUNK.
APPLICATION FILED JAN. 27, 1909.
961,553.
Patented June 14, 1910.
2 SHEETS—SHEET 1.
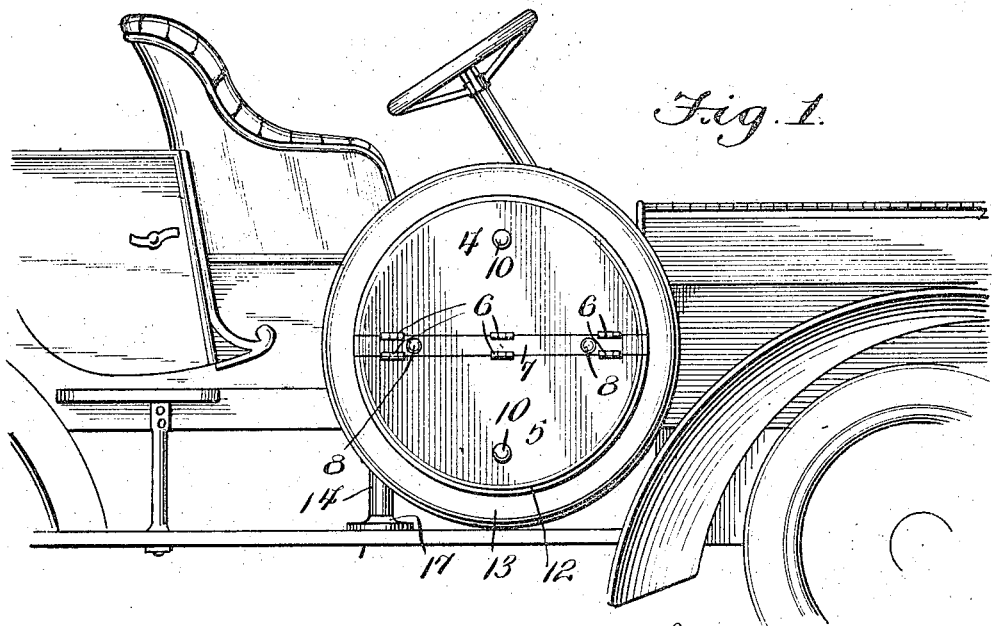
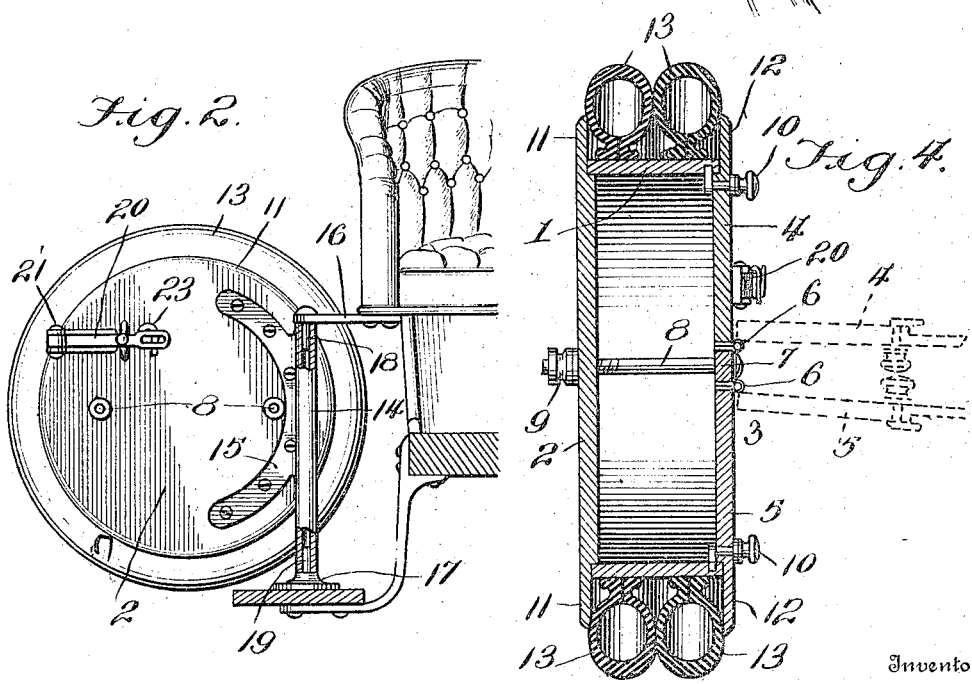
Inventor
Frederic S. Suthergreen,
By Victor J. Evans
Attorney
Witnesses
J. T. L. Wright,
R. M. Smith.

F. S. SUTHERGREEN.
TIRE HOLDER AND TRUNK.
APPLICATION FILED JAN. 27, 1909.

961,553.

Patented June 14, 1910.
2 SHEETS—SHEET 2.

Witnesses
J. L. Wright.
R. M. Smith.

Inventor
Frederic S. Suthergreen,
By Victor J. Evans,
Attorney.

UNITED STATES PATENT OFFICE.

FREDERIC S. SUTHERGREEN, OF MANCHESTER, MASSACHUSETTS.

TIRE-HOLDER AND TRUNK.

961,553.  Specification of Letters Patent.  Patented June 14, 1910.

Application filed January 27, 1909. Serial No. 474,531.

*To all whom it may concern:*

Be it known that I, FREDERIC S. SUTHERGREEN, a citizen of the United States, residing at Manchester, in the county of Essex and State of Massachusetts, have invented new and useful Improvements in Tire-Holders and Trunks, of which the following is a specification.

This invention relates to a combined tire holder and trunk for use on automobiles and other vehicles employing detachable tires, the object of the invention being to provide a trunk or carrying case the construction of which adapts it to be swung on hinges at the side of the machine and to hold one or more tires in position thereon while guarding efficiently against the surreptitious removal of the tires by unauthorized persons.

With the above and other objects in view, the invention consists in the novel construction, combination and arrangement of parts herein fully described and claimed.

Figure 3:
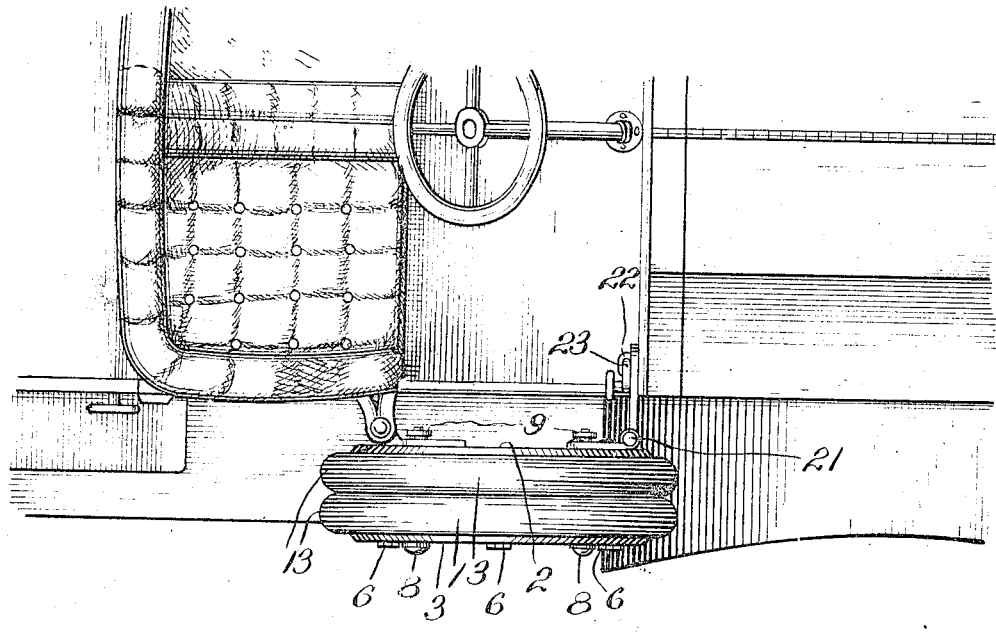
Figure 5:
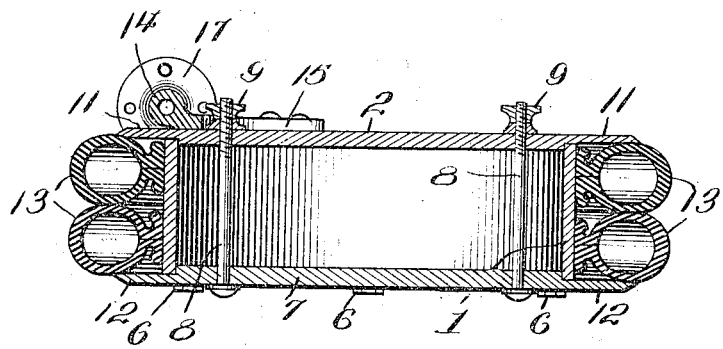

In the accompanying drawings, Figure 1 is a side elevation of the combined tire holder and trunk shown in its normal position of application to an automobile. Fig. 2 is an inner face view thereof, showing the holder and trunk swung outward to one side to permit a person to alight from or enter an automobile, portions of the machine being shown in section. Fig. 3 is a plan view of Fig. 1. Fig. 4 is a vertical diametrical section through the combined tire holder and trunk on an enlarged scale. Fig. 5 is a horizontal section through the same.

The trunk or carrying case which also forms the holder for extra tires, is in the form of a shallow and hollow cylinder as best indicated in Figs. 4 and 5, the same comprising a cylindrical body or rim 1 and disk shaped heads 2 and 3 which normally close the opposite sides thereof. The inner head 2 is preferably formed in one piece, while the outer head in order to give access to the interior of the trunk or case embodies hinged semi-circular sections 4 and 5 which constitute the doors of the trunk or case, the same being connected at their inner adjacent edges by means of hinges 6 to a center strip or section 7 which is secured rigidly and immovably in place by means of head fastening bolts 8. The strap or section 7 is preferably held in place by a pair of such bolts 8 as shown in Figs. 2 and 5, the heads of said bolts bearing against the strip or section 7 while the other ends have nuts 9 threaded thereon, said nuts being preferably of the mill or thumb type to permit of their ready removal in order that the bolts 8 may be withdrawn and the entire front head 3 of the trunk or case removed. The construction described also enables the hinged sections or doors 4 to be swung outward from the full line position of Fig. 4 to dotted line position indicated in the same figure. This permits the trunk or carrying case to be readily filled with any desired luggage. Each of the hinged sections 4 is also provided with a button 10 by means of which it may be secured in a closed position as shown in Fig. 4.

In order to adapt the trunk or carrying case to be used as a tire holder, the marginal edges of the front and back 2 and 3 are extended beyond the outer periphery of the body 1 to form flanges 11 and 12 between which one or more extra tires indicated at 13 may be placed as best shown in Figs. 4 and 5, said tires being confined between the flanges 11 and 12, thereby preventing their removal except by opening the hinged sections or doors 4 and 5. It may be stated at this point that any suitable locking device may be employed for preventing the hinged sections or doors being opened by unauthorized persons. By swinging the doors or hinged sections outward to the dotted line section shown in Fig. 4 the doors 13 may be readily removed from the holder and as easily replaced thereon.

On its inner side, the holder is provided with a hinge knuckle 14 having an arcuate leaf or extension 15 which is screwed or otherwise secured to the inner head of the trunk or carrying case as shown in Fig. 2. Associated with the hinge knuckle are upper and lower brackets 16 and 17 respectively, the latter being provided with pintles 18 and 19 which enter the opposite ends of the knuckle 14 as clearly shown in Fig. 2. The brackets 16 and 17 are secured to convenient parts of the automobile chassis and are located in such position as to enable the combined holder and trunk to be swung to the position shown in Fig. 2. In the position shown in Fig. 1 the device obstructs the entrance way to the front seats of the machine but when the device is swung outward to the position shown in Fig. 2 such passageway is left unobstructed, thus giving ready access to the front seats of the machine.

20 designates a latch having a hinged connection at 21 with the back of the holder, said latch being adapted to engage a keeper 22 on the dashboard of the machine and said keeper being preferably in the form of an eye which is also adapted to receive a hook 23 carried by the latch, thus forming a double lock which is not liable to jar loose and allow the device to swing unintentionally.

In order to admit of extra large articles being placed in the trunk or carrying case, the bolts 8 permit the entire front to be removed and replaced and securely fastened.

I claim:—

1. A combined tire holder and trunk embodying a cylindrical body, adapted to fit within a detachable tire and provided with circumferential flanges at opposite sides which project beyond the periphery of the body, means adapting one of said flanges to be detached from the body, and a support for said holder fastened to the back thereof and to the vehicle and adapted to maintain the holder in an upright position, substantially as described.

2. A combined tire holder and trunk having the form of a hollow cylinder, a head at one side of said cylinder extended beyond the periphery of the cylindrical body to form a circumferential flange, a head at the opposite side of the body extended to form a circumferential flange projecting beyond the periphery of the body, one of said heads being removable and a support for said holder fastened to one of the heads thereof and to the vehicle and adapted to maintain the holder in an upright position, substantially as described.

3. A combined tire holder and trunk embodying a hollow cylindrical body, heads at opposite sides thereof having their marginal edges extended beyond the periphery of the body to form tire retaining flanges, one of said heads embodying a hinged section which includes a portion of one of the flanges, said hinged section being adapted to swing outward to admit of the placing of a tire around the body of the holder and the removal of such tire therefrom.

4. A combined tire holder and trunk comprising a hollow cylindrical body, heads at opposite sides thereof projecting beyond the outer periphery of the body to form tire retaining flanges, means for hinging said body on a substantially vertical axis to allow the same to swing in a substantially horizontal plane, and means for shifting a portion of one of said heads to admit of the application and removal of a tire.

5. A combined tire holder and trunk for the purpose specified embodying a hollow cylindrical body approximately of the same size as the internal dimensions of a detachable tire, heads at opposite sides of said body, one of said heads comprising a hinged and swinging section, means for fastening said section closed, a supporting hinge for connecting said body to a wheeled vehicle to permit the body to swing in a substantially horizontal plane, and a fastening device for connecting a portion of said holder to the vehicle to prevent such swinging movement.

6. A combined tire holder and trunk for the purpose specified comprising a hollow cylindrical body, heads applied to the opposite sides of said body extending beyond the periphery thereof to form tire retaining flanges, one of said heads comprising a center strip or section, bolts passing through said strip or section and connected with the opposite head, and other sections hinged to the center strip or section and embodying portions of one of said tire retaining flanges.

In testimony whereof I affix my signature in presence of two witnesses.

FREDERIC S. SUTHERGREEN.

Witnesses:
CHESTER S. TAYLOR,
MARGARET M. SUTHERGREEN.